United States Patent [19]

Newton

[11] 4,142,514
[45] Mar. 6, 1979

[54] SOLAR HEAT COLLECTOR

[75] Inventor: Alwin B. Newton, York, Pa.

[73] Assignee: Solation Products, Inc., York, Pa.

[21] Appl. No.: 793,380

[22] Filed: May 3, 1977

Related U.S. Application Data

[63] Continuation-in-part of Ser. No. 657,883, Mar. 4, 1976, abandoned.

[51] Int. Cl.² ............................................. F24J 3/02
[52] U.S. Cl. ................................... 126/271; 350/296
[58] Field of Search ............................. 431/270, 271

[56] References Cited

U.S. PATENT DOCUMENTS

| | | | |
|---|---|---|---|
| 1,014,972 | 1/1912 | Nichols | 126/271 |
| 1,162,505 | 11/1915 | Nichols | 126/271 |
| 1,683,266 | 9/1928 | Shipman | 126/271 |
| 1,880,938 | 10/1932 | Emmet | 126/271 |
| 2,907,318 | 10/1959 | Awot | 126/271 |
| 2,969,788 | 1/1961 | Newton | 126/271 |
| 3,215,134 | 11/1965 | Thomason | 126/271 |
| 3,321,012 | 5/1967 | Hervey | 126/271 |
| 3,866,285 | 2/1975 | Clark | 126/271 |
| 3,915,147 | 10/1975 | Rineer | 126/271 |
| 3,951,128 | 4/1976 | Schoenfelder | 126/271 |
| 3,974,824 | 8/1976 | Smith | 126/271 |
| 3,995,804 | 12/1976 | Folds et al. | 126/271 |
| 4,002,499 | 1/1977 | Winston | 126/271 |
| 4,003,366 | 1/1977 | Lightfoot | 126/271 |
| 4,024,852 | 5/1977 | L'Esperance et al. | 126/271 |
| 4,059,094 | 11/1977 | Mendoza | 126/271 |

*Primary Examiner*—Carroll B. Dority, Jr.
*Attorney, Agent, or Firm*—C. Hercus Just

[57] ABSTRACT

A solar collector utilizing elongated channel-shaped reflector members which comprise modified parabolas in cross-section to reflect sun rays onto straight sections of a tubular conductor of heat-transfer fluid located substantially along the focal lines of said reflector members and being oval in cross-section to intercept the rays of the sun as the position of the sun rises above and falls below the central axes of said reflector members, a series of said reflector members and conductors being horizontal in use for gravity drain and flow and the ends of the straight sections being connected to provide a sinous tube system. An insulating frame supports said reflector members and tube systems and a transparent cover extends across the outer face in use.

9 Claims, 14 Drawing Figures

SOLAR HEAT COLLECTOR

This application is a continuation-in-Part of U.S. application, Ser. No. 657,883, filed Mar. 4, 1976 and now abandoned.

BACKGROUND OF THE INVENTION

Development of solar heat collectors has engaged inventive minds for many years. One of the principal objectives in attempting to develop effective collector units has been to utilize the principle of parabolic reflectors in an effort to concentrate as much heat as possible from the sun rays onto a fluid conductor containing heat-transfer fluid of one kind or another. Examples of the employment of parabolic-type reflectors in prior devices are represented by U.S. Pat. Nos. 1,162,505, to Nichols, dated Nov. 30, 1915; 1,683,266, to Shipman, dated Sept. 4, 1928; and 1,880,938, to Emmet, dated Oct. 4, 1932.

In utilizing a true parabolic cross-section in a reflector for sun rays to direct the rays intensely upon a fluid conductor disposed at the focus of the reflector member, it is necessary to mount the reflector for pivotal movement either during the day or during the seasons, due to the fact that in the winter season, the sun is $23\frac{1}{2}°$ below the equinox or latitude angle at noon, whereas in the summer season, the sun is higher, and is approximately $23\frac{1}{2}°$ above the equinox or latitude angle at noon. The latitude angle also varies in accordance with the location of the installation upon the face of the earth. For example, in the temperate zone, and more specifically, in Pennsylvania, the equinox or latitude angle is approximately 40° relative to the horizontal, at noon. Therefore, in an effort to compensate for this situation, the aforementioned patents to Nichols and Shipman have provided pivotal mountings for the reflector member.

Another attempt to cope with the situation referred to above comprises U.S. Pat. No. 3,321,012, to Hervey, dated May 23, 1967. It will be seen that this patent utilizes a reflector system which is semi-circular in cross-section and employs a tubular conductor which is flat and substantially rectangular in cross-section and is positioned substantially radially with respect to the reflecting surface of the reflector member for purposes of attempting to increase the contact area for radiation. Also, the present inventor obtained U.S. Pat. No. 2,969,788, dated Jan. 31, 1961, in which pairs of reflector members were positioned with respect to fluid-circulating tubes with the reflector members which, in cross-section, are curved somewhat in a parabolic manner but pairs of such curved sections are used inversely to a parabolic arrangement and, further, these reflector members are mounted for pivotal adjustment to render the same movable during different times of the day in an effort to achieve maximum reflection of the sun rays onto the fluid-containing tubes.

In general, it also appears to be the tendency in prior developments of solar heat collectors to dispose the conducting tubes substantially vertically or at least disposed in vertical planes when in use, there usually being horizontal manifolds extending along the upper and lower ends of the tube to effect circulation of fluid therethrough. Depending upon how the fluid is circulated in said tubes, drainage problems sometimes exist when it is desired to drain the system for any reason.

In accordance with the present invention, it now has been found that there are areas of improvement which do not appear to have been explored or developed previously, these improvements being directed toward the simplification of the reflector members in particular, as well as the cross-sectional shape of the fluid-conductor system, details of which are set forth below.

SUMMARY OF THE INVENTION

One of the principal objectives of the present invention is to employ reflector elements which, in cross-section, comprise modified parabolic shapes and also to employ tubular fluid conductors which are disposed substantially at the focal area of the elongated reflector members, said conductors being substantially oval in cross-section and the major axes of the oval shape being within a plane bisecting the modified parabolic reflector members to permit substantially all rays of the sun to be reflected onto said conductors as the position of the sun varies during the day.

Ancillary to the foregoing object, it is a further object to modify the cross-sectional parabolic shape of the reflector to dispose the sides thereof farther apart than in a true parabolic cross-sectional shape, said modified shape, in conjunction with the oval cross-section of the fluid conducting tube being effective for reflection of the sun rays onto the tube for a much longer period during the day, as well as during the changing seasons of the year, this being accomplished without requiring the mounting of the reflector members for movement as in the prior devices referred to above.

Another object of the invention is to arrange the modified parabolic reflector members in elongated manner and dispose the same substantially horizontally in use and mount them within a frame having members and a bottom, the apexes of said reflector members preferably engaging said bottom for support and the open faces of said reflector members preferably being covered by and in close proximity to a transparent cover for maximum utilization of radiated heat.

A further object of the invention is to dispose straight sections of the fluid-containing tubes substantially along the focal lines of the reflector members and the opposite ends of the tubes being connected by reversed bends to provide a continuous tube system which is sinous and the connections for the ends of said straight tube sections being disposed within recesses in side members of a supporting frame for the reflectors and thereby provide simple support means for the tubes which permit expansion and contraction thereof incident to use under various temperature conditions.

Another object of the invention in regard to a supporting frame for the reflectors and tube system is to form a back panel and side panel members from heat-insulating material for maximum efficient utilization of radiation, the opposite face of the frame being covered by a transparent sheet and the edges of the reflector members preferably being adjacent the inner surface of the covering sheet to reduce heat losses between adjacent compartments within the reflector members.

Still another object of the invention is to provide the inner face of the back of the aforementioned frame member with highly reflective means to minimize the escape of heat through the back panel of the frame.

One further object of the invention is to provide a pair of cover sheets across the open faces of the reflector members, said sheets being spaced apart a limited distance transversely and sealing means applied to the edges thereof to reduce heat losses through the cover means and also provide a limited convection space.

A still further object of the invention is to provide supports for the cover sheet between the open faces of the reflector members to permit evacuation of the interiors thereof.

Details of the foregoing objects and of the invention, as well as other objects thereof, are set forth in the following specification and illustrated in the accompanying drawings comprising a part thereof.

DETAILED DESCRIPTION

Figure 1:
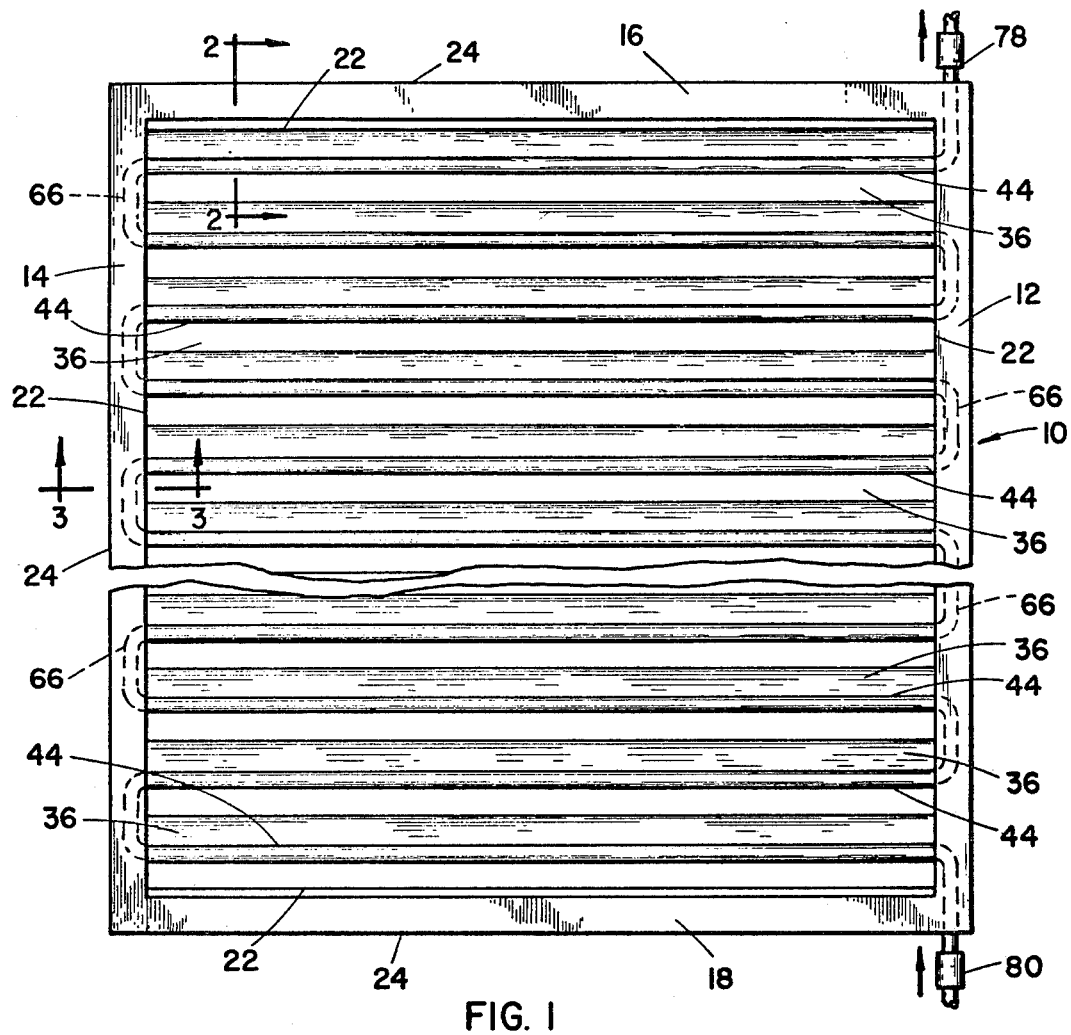
FIG. 1 is a plan view of an exemplary solar heat collector embodying the principles of the present invention.

As indicated hereinabove, the present invention pertains to a solor heat collector 10 which is illustrated in front view, in FIG. 1, in foreshortened manner, it being understood that said collector may be manufactured in various widths and lengths, consideration being given to the dimensions of the roof surface, or other supporting surface, upon which the collector is to be mounted for purposes of utilizing solar energy in the form of rays directed from the sun toward the earth. The collector 10 comprises a preferably rectangular frame including end panels 12 and 14, a top panel 16, and a bottom panel 18. The panels 12, 14, 16 and 18 comprise sides or side panels of said rectangular frame and, connected to the bottom edges of said panels, is a back or bottom panel 20. All of said side panels, as well as the back or bottom panel 20, preferably are formed in laminar manner such as by bending sheet metal into appropriate shape to provide a pair of inner and outer walls 22 and 24, between which suitable heat-insulating meaterial 26 is disposed, such as rockwool or any other comparable or appropriate insulating material of which substantial numbers are available at present. The metallic members of the frame are appropriately protected against rusting or corrosion, such as by appropriate paint or plating.

Figure 2:
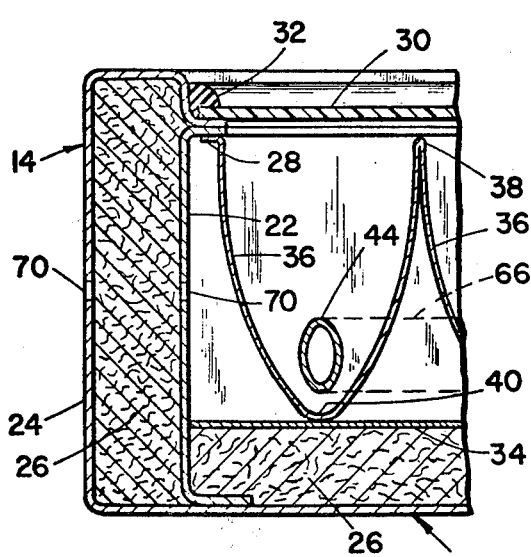
FIG. 2 is an enlarged, fragmentary cross-sectional shape of part of the heat collector shown in FIG. 1, as seen on the line 2—2 thereof.
Figure 3:
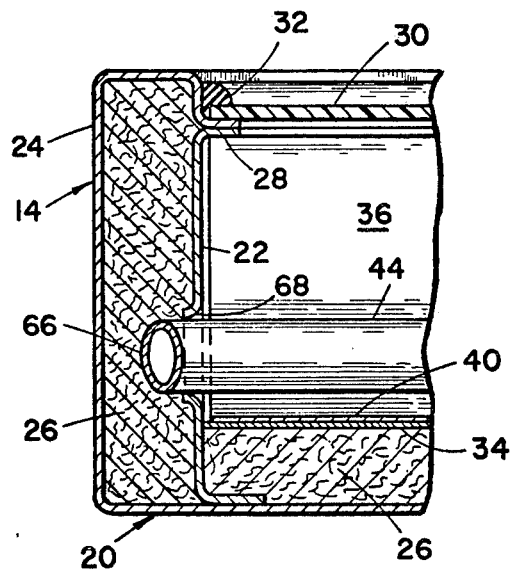
FIG. 3 is an enlarged fragmentary sectional view of the heat collector shown in FIG. 1, as seen on the line 3—3 thereof.

Referring to FIGS. 2 and 3 in particular, it will be seen that certain edges of the metal material from which the walls 22 and 24 of the side panels are formed are appropriately bent so as to provide an inwardly extending flange 28 for purposes of supporting the edges of a cover panel 30 which preferably is transparent and may comprise glass or suitable sheet plastic material readily capable of transmitting solar energy. Said cover panel 30 may be rigid or otherwise. The edges thereof preferably are sealed, such as by a strip of mastic sealing material 32. Further, in the preferred construction, the back or bottom panel 20 has an appropriate thickness, such as of the order of about 1¼ inches or 1½ inches and the upper or inner surface thereof has a suitable reflective sheet 34 overlying the same, the same comprising aluminum foil or the like.

One of the most important features of the present invention comprises the cross-sectional shape of the reflector elements 36 which are channel-like as shown in FIGS. 2, 4–7, 8, 10 and 11. Preferably, the reflector elements 36 are formed from lightweight, highly reflective materials, such as aluminum foil, very thin stainless steel having a polished surface, or otherwise. Various means may be employed to support the same so as to extend at the opposite ends thereof between the inner surface members 22 of the end panels 12 and 14 of the frame shown in FIG. 1. Also, as illustrated in exemplary manner in FIG. 2, the upper edges of adjacent reflector members 36 may be connected at 38 or merely may be disposed in close or abutting engagement with respect to each other. The apexes 40 of the reflector members 36 also may be supported by resting upon the upper surface of the reflective sheet 34 and, if desired, said apexes may be affixed thereto by appropriate cement or otherwise.

Figure 4:
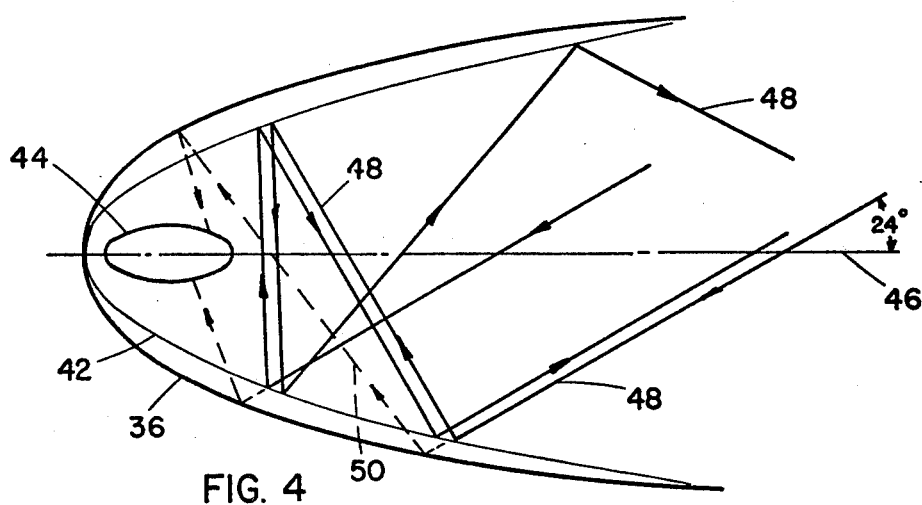
FIG. 4 is a diagrammatic cross-section of one preferred embodiment of reflector member shown in comparison with a true parabolic cross-sectional shape.

As also referred to hereinabove, the cross-sectional shape of the reflector elements 36 is a modified parabola and, in reality, comprises a developed shape which departs from a true parabolic cross-sectional shape as can be seen particularly from FIGS. 4 and 5. In FIG. 4, for example, a true, geometrically accurate parabolic shape 42 is illustrated and it will be seen that the opposite sides of the reflector element 36 shown in FIG. 4 are spaced apart a greater distance than that of the sides of the parabola 42. This is for purposes of providing a more effective reflection of sun rays, as the height of the sun varies relative to the horizon, onto the tubular conduit 44 which, in cross-section, is oval and, preferably, is elliptical, the major axes thereof being coincident with the line 46 which bisects the reflector elements 36. The conduit 44 is spaced along the line 46 a limited distance and is approximately coincident with the focal axis of the modified parabolic reflector element 36. The purpose of the fluid-conducting tubular conduits 44 being elliptical is to provide greater target area for radiation than a tube which is circular in cross-section. Further, in effect, the opposite sides of the tubular conduit 44 which are nearest the side surfaces of the reflector elements 36 provide a wider target to receive the reflected rays of the sun as the same are reflected by the modified parabolic surfaces of the reflector members 36 during different periods of any given day, as well as during various seasons of the year.

Figure 5:
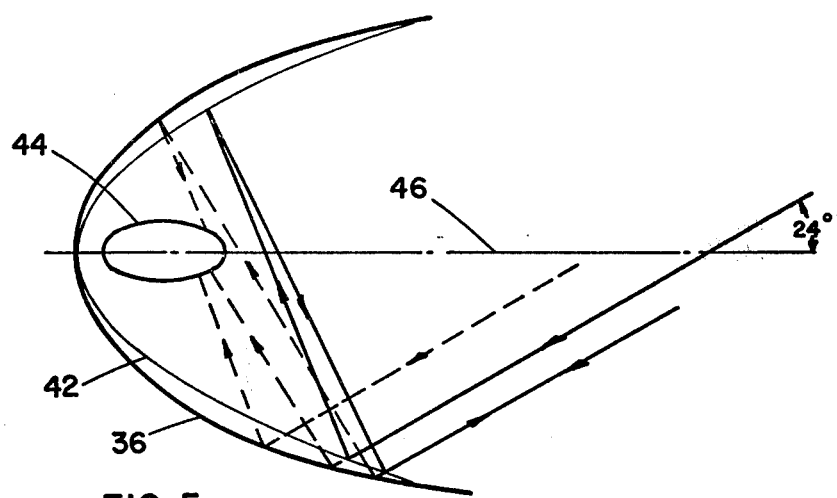
FIG. 5 is a view similar to FIG. 4 but showing the shape of a reflector member for use in a different latitude than the shape of the reflector shown in FIG. 4.

For reflective purposes, the benefit of the modified parabolic cross-sectional shape of the reflector elements 36 is represented in FIG. 4, wherein the solid lines 48 represent typical paths of reflected rays with respect to the parabola 42, whereas the dotted line 50 illustrates the reflection of sun rays with respect to the reflective surfaces of the opposite sides of the modified parabolic reflector elements 36. r Comparing FIGS. 4 and 5, it will be seen in FIG. 5 that the outline of the reflector surface 36, in effect, is wider than the shape of the reflector element 36 in FIG. 4. Such wider shape illustrated in FIG. 5 is for use in different latitudes than that for which the reflector 36 shown in FIG. 4 is designed and particularly where the hours of daylight are longer and it is desired to utilize as much of the sun rays as possible during the entire period of sunlight being available. However, it nevertheless will be seen that a true comparable parabolic shape 42 is generally narrower than that of the sides of the reflector element 36.

Figure 6:
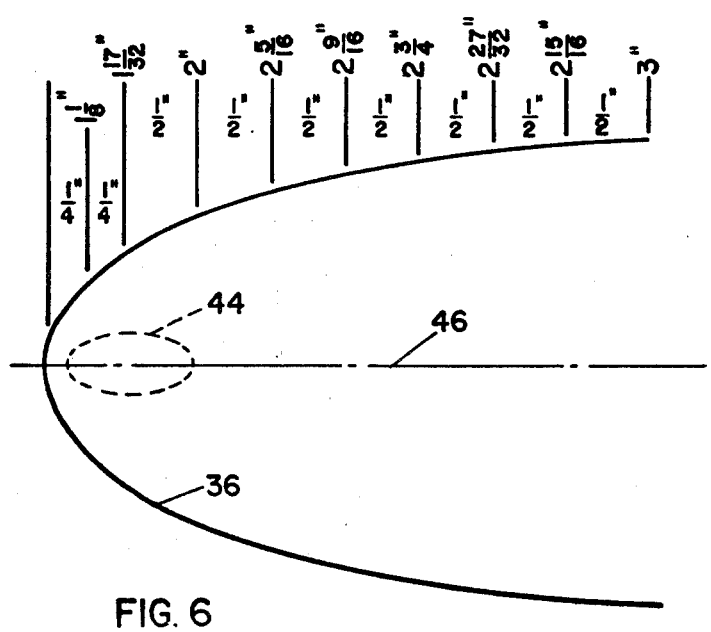
FIG. 6 is a diagram showing dimensions of the developed cross-sectional shape of the reflector member shown in FIG. 4.

The shapes of the modified parabolas shown in cross-section in FIGS. 4–6, as well as in other corresponding figures, are different from any mathematical formulation as far as is known. Therefore, for purposes of defining the shapes of the reflectors shown in the drawings of this application, further attempts to analyze the curve configurations has resulted in the development of FIGS. 13 and 14 for purposes of providing a basis for the following descriptions of these curved cross-sectional shapes. Said shapes of the modified parabolas are such that, for purposes of providing a basis for certain claim terminology, they are shown in relation to a true parabola and a semi-circle, said semi-circle being in contact with the apex of both the modified parabola and a true parabola.

Figure 13:
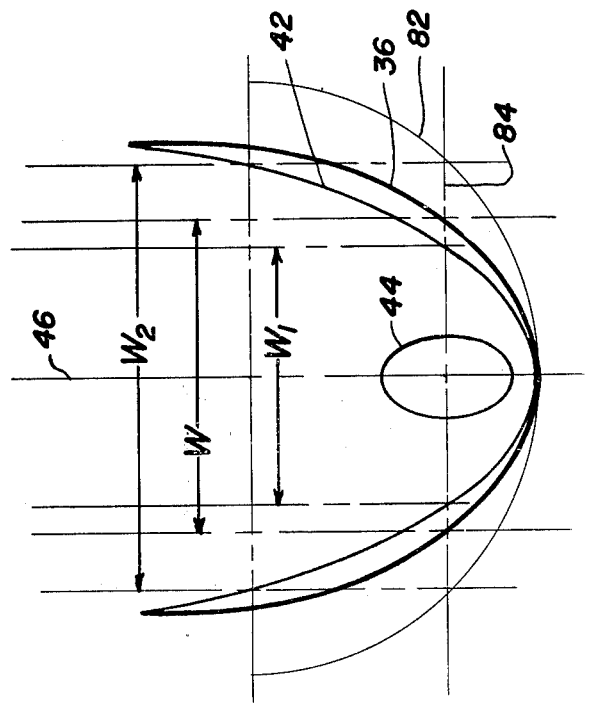
FIG. 13 is a cross-sectional view similar to FIG. 5 but supplemented to show the relation of the modified parabola therein to a semi-circle.

In FIG. 13, the modified parabola of the invention is represented by the cross-section of reflector element 36 which, it will be seen, is wider in the midportion than the corresponding true geometrical or mathematical parabola 42. There has been added to the figure, a semi-circle 82 which at its midportion abuts the apxes of the modified parabola 36 and true parabola 42.

A transverse line 84 in FIG. 13 extends across the central axis of tubular conduit 44 in perpendicular relation to the axis 46 which bisects the parabolas. Considering line 84 as a base line, reference dimension lines are extended from said base line respectively to compare the relative widths at that line of the modified parabola 36, true parabola 42, and semi-circle 82. The indicia W indicates the width of the modified parabola, $W_1$ is the width of the true parabola, and $W_2$ is the width of the semi-circle. It will be seen that, at line 84, the modified parabola is between the true parabola and semi-circle but much closer to the true parabola than the semi-circle. Also, it has been determined from said figure that the width of the modified parabola at said line is between approximately $1.05 \times W_1$ and $0.9 \times W_2$ and ends on the opening of the true parabola.

Figure 14:
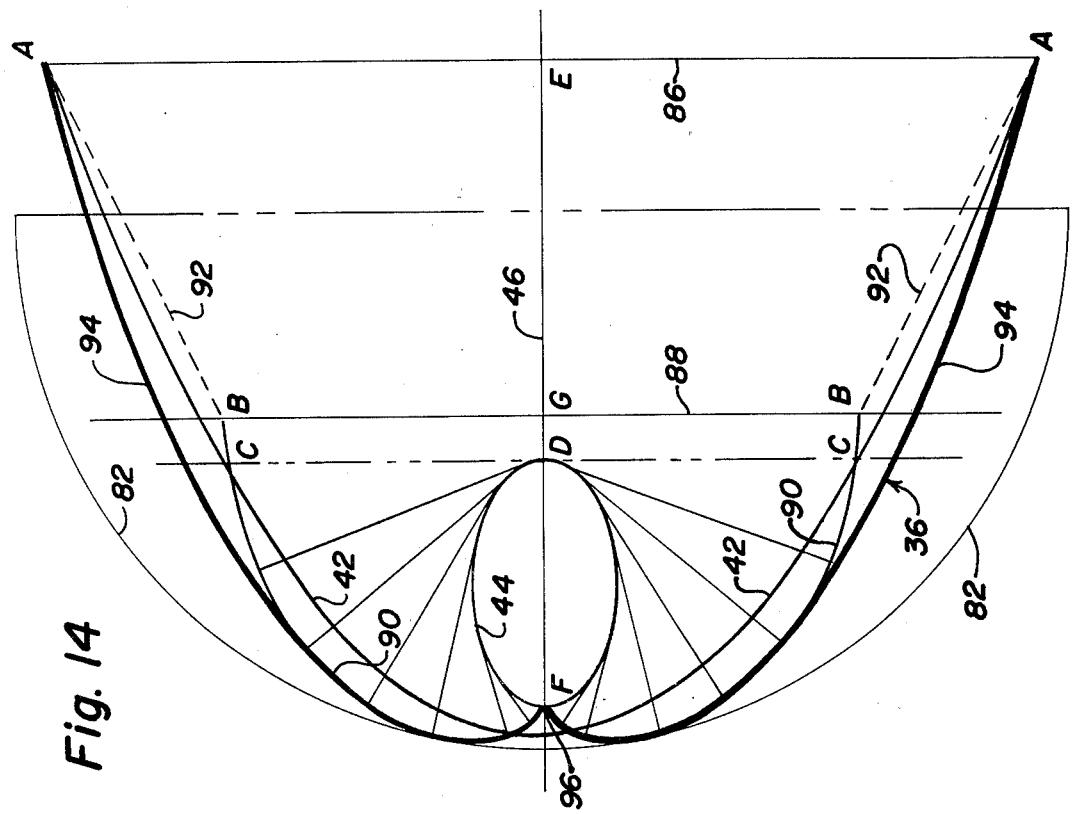
FIG. 14 is a cross-sectional view of a modified parabolic reflector similar to that shown in FIGS. 5 and 13 but showing a further modification in the curvature of the apex end of the modified parabola.

A different embodiment of the present invention is illustrated in FIG. 14 in which the modified parabola is an involute of one half of the ellipse comprising the tubular conduit 44. In FIG. 14, one-half of the ellipse 44 is unwrapped between F and D and this is also equal to the line CD. At a distance of between 1.6 to 1.75 times the major axis of the ellipse, a line 86 is drawn transverse to line 46. Line 86 is four times the length of the major axis of the ellipse to establish points A in said figure.

A distance equal to 0.20 the length of the major axis of conduit 44 is laid off on line 46 beyond point D on said elliptical conduit and another transverse line 88 is drawn which is parallel to line 86. Where the involute 90 intersects line 88, points B are established. Dotted lines 92 are drawn between points A and B. The edges of the reflector 36 can terminate anywhere along these lines but for greater capacity, the design which extends to points A is preferred. The selected points, such as A, are connected tangentially to the involute 90 by a substantially straight line or preferably, by a shallow curve 94, which bows outwardly, as clearly shown in FIG. 14.

From FIG. 14, it also will be seen that the sides of the reflector 36 comprise the major portion of the involutes extending from point F to the tangential engagement by shallow curves 94. Also, from this figure, it will be seen that the sides of the reflector 36 are between the true comparable parabola 42 and the semi-circle 82. Further, the reflector 36 in FIG. 14 differs from reflector 36 in FIGS. 4, 5 and 13 by including a re-entrant barrier point 96 which extends longitudinally and engages the adjacent end of elongated conduit 44 and comprises part of the involute 90 to prevent the escape of rays from one side of reflector 36 to the other.

Figure 7:
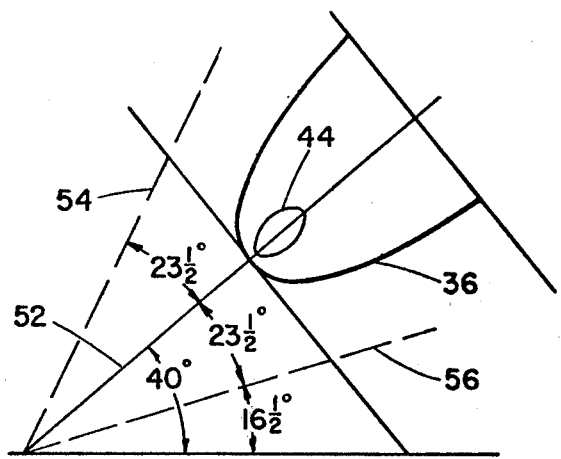
FIG. 7 is a diagram illustrating the range of angles of the sun rays with respect to the horizontal at different seasons of the year and with respect to the equinox or latitude angle, all of said angles being assumed at noon.

Referring to FIG. 7, another objective of the modified or developed shape of the opposite sides of the reflector elements 36 is illustrated. Utilizing the latitude of Pennsylvania as an example, the equinox or latitude angle 52 is shown at 40° to the horizontal and the reflector 36, as well as the exemplary tubular conduit 44, are illustrated as being bisected by the angle line 52. As indicated above, in the winter season, the rays of the sun, at noon, are substantially 23½° below the equinox or latitude angle 52, whereas in the summer season, the rays of the sun at noon, are substantially 23½° above the equinox or latitude angle line 52. Accordingly, the summer latitude angle line 54 is illustrated, as well as the winter latitude angle line 56. It also will be seen that especially in the winter season, when it is desired to utilize as much of the sun's rays as possible, even to the horizontal as when the sun is setting, it will be seen that the horizontal is at an angle of an additional 16½° below the winter latitude angle line 56. Hence, the reflector elements 36 have been designed in shape to cause the rays of the sun to be reflected onto tubes 44 during all daylight hours.

One of the very suitable locations to mount a solar heat collector is upon the roof of a house. To illustrate this, attention is directed to FIG. 10 in which an exemplary outline of a house 58 is shown in which, in solid lines, a relatively steep roof 60 is shown whereas in dotted lines, the outline of a less steep roof 62 is shown. Also, an exemplary heat-transfer tank 64 is shown in exemplary manner such as in the attic of the house 58.

Figure 10:
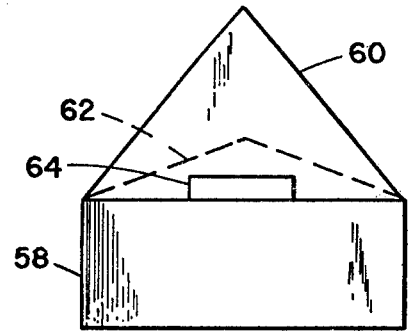
FIG. 10 is a diagrammatic exemplary illustration of the shape of a house showing in full lines one angle of the slope of the roof and, in phantom, a different angle of slope of the roof for purposes of illustrating the reflector shapes illustrated in the following figures.
Figure 11:
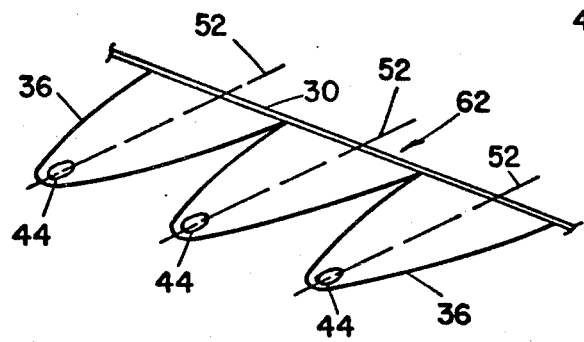
FIG. 11 is an exemplary fragmentary cross-sectional view showing the shape of reflector members when applied to the roof of a house having a relatively acute angle with respect to the horizontal.
Figure 12:
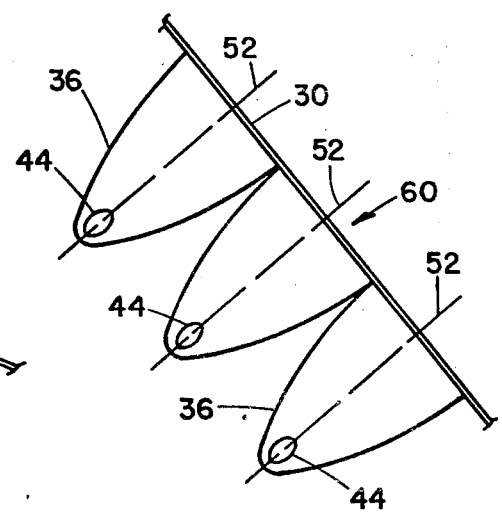
FIG. 12 is a view similar to FIG. 10 but showing the shape of the reflector members for a collector of the present invention when applied to a roof having a greater angle with respect to the horizontal than illustrated in FIG. 10.

Actually, the tank 64 may be mounted at any appropriate location and preferably is insulated. Suitable conduit circuitry, not shown, is connected between the tubular conduit system comprising the conduit sections 44, a pump which also is not shown, and the heat transfer tank 64. At present, so-called ranch style homes are very popular and these have roof surfaces 62 which are disposed at a much more acute angle to the horizontal than the steeper type of roof 60. Accordingly, in constructing the reflector elements 36 with respect to these different slopes of roof surfaces, attention is directed to FIGS. 11 and 12. In FIG. 11, the reflector elements have the upper edges shorter than the lower edges thereof in order to preferably dispose the axis of the modified parabolic reflector elements 36 coincident with the latitude angle 52 and also dispose the edges adjacent the inner surfaces of the cover panel 30. In FIG. 10, the steeper roof angle 60 is illustrated and under such circumstances, the opposite edges of the reflector elements 36 are substantially equal and the axis of each of said elements is substantially perpendicular to the surface of the roof 60 and the cover panel 30 thereof, said axes also being substantially coincident with the latitude angle 52.

The tabular conduits 44 shown in the various figures of the drawings comprise straight sections of an otherwise continuous, sinuous tubular system such as illustrated in FIG. 1. When mounted in the reflector elements 36, the straight tubular conduit sections 44 are coincident with the focal lines of the modified parabolic configurations of the reflector elements 36 and are coincident with the length of the elements 36 as can be seen from FIG. 1. However, the similar ends of adjacent straight conduit sections 44 are connected by end portions 66 which, preferably, are continuous with the straight sections 44. To support the sinuous conduit system comprising the sections 44 and connecting end portions 66, the inner portions of the end panels 12 and 14 are provided with appropriate flanged openings 68 to permit the end portions 66 of the conduit system to extend therethrough and into the insulation material 26 as shown in FIG. 3. This arrangement provides a ready and very simple supporting means for the opposite ends of the straight sections 44 of the tubular conduit system. Further, by such arrangement, expansion and contraction of the straight sections 44 readily may occur and a limited movement of the opposite ends of the straight sections 44 relative to the openings 68 in the end panels 12 and 14 takes place without difficulty or interference.

Referring to FIG. 2, attention is directed to the fact that the inner and outer walls 22 and 24 of the end panels 12 and 14 may be provided with small vent openings 70 through which ambient air from the outside or air from the inside of the solar heat collector 10 may move and the insulating material 26 disposed between the walls 22 and 24 serves as a filter for such air.

Figure 8:
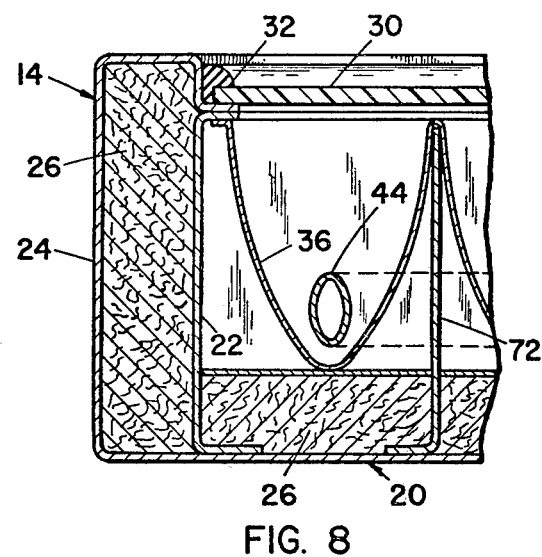
FIG. 8 is a fragmentary vertical sectional view of the heat collector shown in FIG. 1 but illustrating a further modification for supporting a transparent cover sheet for said collector.

Referring to FIG. 8, if desired, especially if the transparent cover panel 30 is of only limited thickness, supplementary support thereof may be provided in the form of thin panels 72 which extend upward from the bottom panel 20 of the frame, by which the lower edges thereof are supported, and the upper edges of the panels 72 engage the inner surface of the cover panel 30. The panels 72 may be formed from any suitable material, such as thin metal, plastic sheet material, wood, or otherwise and provide support for panel 30 when, if desired, the interior of the units are to be evacuated.

Figure 9:
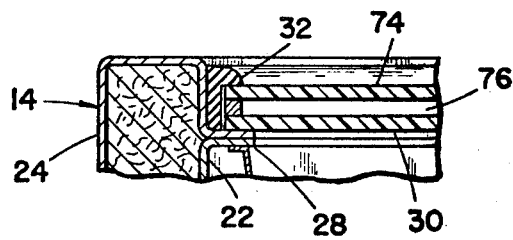
FIG. 9 is another fragmentary vertical sectional view on an enlarged scale, similar to FIGS. 2 and 3 but illustrating a further embodiment of cover sheet arrangement than that illustrated in FIGS. 2 and 3.

For purposes of further reducing heat losses through the cover of the collector and also provide limited convection space, attention is directed to FIG. 9 in which it will be seen that an additional cover panel 74 which may be similar in nature and size to the cover panel 30, is disposed above the panel 30 and is spaced therefrom. Preferably, the edges of the panels 30 and 72 are sealed to provide a sealed space 76 therebetween which results in the aforementioned reduction of heat losses and limited convection space being formed. Additional mastic material 32 is employed not only to effect the spacing between the cover panels 30 and 74 but also to seal the edges of the additional cover panel 74 with respect to the upper portions of the side panels of the frame of the collector 10.

Further to increase the effectiveness and efficiency of the operation of the collector 10, the interior thereof may be evacuated, if desired. Under such circumstances, the vents 70 in certain of the side panels will be eliminated and the well-known advantages of an evacuated atmosphere for heat insulation is utilized to increase the efficiency of absorption of heat by the fluid contained within the conduit system comprising the sections 44 and the connecting end portions 66.

The tubes from which the sections 44 and end portions 66 are formed preferably are copper tubing which, for example, may be of the order of what is commercially known as one-half inch tubing. By way of example, without limitation, the tubing will have an outer diameter initially of approximately five-eighths of an inch and when shaped into an elliptical cross-sectional configuration, will have a major axis of approximately seven-eighths of an inch. It may be black chrome plated or oxidized to give it a selective surface and increase the heat absorption properties thereof.

The opposite ends of the tube system employed in the collector have connector means 78 and 80, shown in FIG. 1. These may be of any appropriate type, such as solenoid-operated valves, conventional manually-operated valves, or otherwise. Further, it will be understood that a number of the collector units may be mounted in end-to-end or side-by-side relationship upon a supporting surface such as a roof of a house or other type of building. Further, and very importantly, the collector units preferably have the straight tubular conduit sections 44 disposed horizontally, whereby when it is desired or necessary to drain the system, it readily may be drained by gravity rather than having to be pumped or any other means having to be resorted to in order to effect such draining.

In addition to the ease of draining the system referred to above, there are many other virtues resulting from the structures set forth above, such as the following: The system can operate to 50 psi, or greater, if desired. The copper tubing which is preferred in the system actually comprises a low cost circuit and has minimum corrosion possibilities. Each unit is capable of being manufactured so as to be relatively light in weight, for example, of the order of approximately 160 lbs. for a unit 4 feet by 8 feet in size. There is low pressure drop in the fluid circuit. All components have established long life. There is ease in fluid headering. Also, there is no metallic back plate to which the tubes are connected as in certain commercial units presently available. No expansion and contraction problems are present resulting from thermal conditions in the unit. The supports for the tube system are very simple in addition to permitting normal limited expansion and contraction thereof during use. The rear portion of the unit, which is nearest the support therefor, operates on a relatively cool basis and therefore, needs only approximately three-quarter inch insulation.

Particularly for purposes of heating a fluid medium used to heat various types of enclosures in accordance with the present invention, it is a fact that the months of December and January, in the northern hemisphere, the total insolation received is the lowest of any time in the year. Under such circumstances, it is desired that as much of such insolation as possible is utilized to heat such fluid medium. To accomplish this, it is further contemplated by the present invention to design the modified parabolic reflectors to reflect rays of the sun onto the collector tubes during the entire period of daylight, especially in morning and evening hours when the sun is close to the horizon, as well as at the highest elevation above the horizon at noon.

To do this, the aforementioned limit of 23½° below the equinox angle can be extended to be effective to reflect rays of the sun below such angle, in accordance with the invention.

The unit is also readily capable of being easily sealed, especially if low heat transfer gas is substituted for air, such as Freon-12 or Freon-114.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein:

I claim:

1. A solar heat collector comprising in combination, a frame including opposite parallel side panels, a sinuous tube system having parallel straight sections elliptical in cross-section and spaced transversely apart substantially even distances within a common plane and the ends of said straight sections being connected by reversely turned end portions respectively supported by said side panels of said frame, inlet means at one end of said tube system and outlet means at the opposite end of said tube system, said sinuous tube system being adapted to contain heat-transfer fluid, similar parallel channel-shaped reflector members extending stationarily along each of said straight sections of said tube and having a curved apex and opposite side reflecting surfaces extending therefrom adjacent opposite sides of said elliptical straight tube sections adapted to reflect solar rays onto said tube sections and said elliptical straight tube sections being spaced a limited distance from the apex of said reflector members but coincident with the focal axes thereof and the major axis of said tube sections being coincident with a plane bisecting said reflector members, said reflecting surfaces in cross-section being generated surfaces comprising the opposite continuously smoothly curved sides of a modified parabola in which the midportions of said curved sides are spaced apart a limited distance greater than the opposite sides of a true mathematical parabola, said spacing on a line extending through the center of said elliptical straight tube sections transversely to said bisecting plane being substantially 1.05 times the width of a true parabola along said transverse line and the outer ends of said reflecting surfaces being coincident with the corresponding outer ends of a true parabola at a distance greater than twice the major axis of the tube section beyond the apex of the reflector members but not in excess of three times said distance, whereby said reflector members are adapted in use to reflect solar rays onto said tube system as the sun varies its position above and below the centerline of said channel-shaped reflector members to utilize heat from solar rays as much as possible during daylight hours.

2. The solar heat collector according to claim 1 in which said similar parallel reflector members each comprise reflective sheet material shaped into said modified parabola and each having outer edges and an apex portion positioned to afford maximum reflection of solar rays onto said straight sections of said tube system, said straight sections of said tube system being positioned substantially coincident with the focal axes of said modified parabolic reflector members.

3. The solar heat collector according to claim 1 in which said reflector members have opposite sides which comprise said sides of a modified parabola computed empirically to afford a wider range of reflection of rays of the sun onto said straight tube sections within said reflector members than afforded by mathematically accurate parabolic side surfaces and permit such reflection of rays substantially 23½° above and below the latitude angle to within 16° of the horizontal at the geographical location of said collector.

4. The solar heat collector according to claim 1 further including means to support said frame at an acute angle to the horizontal and wherein planes bisecting said reflector members through the axes of said tubes are disposed substantially at an angle of approximately 40° to the horizon and thereby maximize the time during daylight hours in which said reflector members will reflect solar rays onto said tube system of said solar heat collector.

5. The solar heat collector according to claim 1 in which the shape of each half of said modified parabolic reflector member comprises an involute of one-half of said elliptical sections of tubing constituting the apex portion of said modified parabolic shape and wider than a corresponding true parabola, the outer ends of said reflector members being coincident with the ends of a corresponding true parabola having a central axis substantially between 1.6 and 1.75 times the major axis of said elliptical sections of tubing beyond the outer end of the same, and the outermost sides of said modified parabolic reflector members extending from said outer ends of a true parabola to a point of tangency with said involute apex portions of said reflector members.

6. The solar heat collector according to claim 5 in which said apex portion of each reflector member includes a barrier point portion comprising part of the involute and contacting the adjacent end of said elliptical tubing to prevent reflected solar rays from passing between opposite sides of said reflector members.

7. The solar heat reflector according to claim 5 in which said sides of said reflector members between said outer ends and the point of tangency with said involute apex portions comprise a shallow curve bowed outwardly.

8. The solar heat reflector according to claim 5 in which said sides of said reflector members extend outwardly beyond a corresponding true parabola a limited distance.

9. The solar heat reflector according to claim 5 in which the distance between the outer ends of said reflector members is substantially four times the length of the major axis of said elliptical sections of tubing.

* * * * *